United States Patent
Marlow et al.

(10) Patent No.: US 7,958,363 B2
(45) Date of Patent: Jun. 7, 2011

(54) TOOLBAR SIGNATURE

(75) Inventors: Cameron Marlow, New York, NY (US);
Shanmugasundaram Ravikumar, Berkeley, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 893 days.

(21) Appl. No.: 11/924,945

(22) Filed: Oct. 26, 2007

(65) Prior Publication Data

US 2009/0110199 A1    Apr. 30, 2009

(51) Int. Cl.
*H04L 9/00* (2006.01)
*H04L 9/32* (2006.01)
*G06F 7/04* (2006.01)

(52) U.S. Cl. ........ 713/176; 713/175; 713/187; 713/188; 726/27; 726/28; 726/29; 726/30

(58) Field of Classification Search .................... 713/176
See application file for complete search history.

(56) References Cited

U.S. PATENT DOCUMENTS

2003/0093678 A1* 5/2003 Bowe et al. .................... 713/180
2006/0129463 A1* 6/2006 Zicherman ....................... 705/26

* cited by examiner

*Primary Examiner* — Longbit Chai
(74) *Attorney, Agent, or Firm* — Stattler-Suh PC

(57) ABSTRACT

A method and system are provided for a web browser toolbar signature. In one example, the method includes receiving a submission of user content from a source webpage, receiving a producer identity of a producer who submitted the user content, receiving identifying information about the destination webpage, coding signed content using the user content and the producer identity, wherein the signed content includes a signature, and submitting the signed content to a server hosting the destination webpage.

7 Claims, 6 Drawing Sheets

TOOLBAR SIGNATURE

FIELD OF THE INVENTION

The present invention relates to user content on the Internet. More particularly, the present invention relates to signing user content and later verifying the user content.

BACKGROUND OF THE INVENTION

One way to share information over the Internet is via public-key cryptography. Public-key cryptography, also known as asymmetric cryptography, is a form of cryptography in which a user has a pair of cryptographic keys—a public key and a private key. The private key is kept secret, while the public key may be widely distributed. The keys are related mathematically, but the private key cannot be practically derived from the public key. A message encrypted with the public key can be decrypted only with the corresponding private key.

The two main branches of public key cryptography are public key encryption and digital signatures. Public key encryption is where a message encrypted with a recipient's public key cannot be decrypted by anyone except the recipient possessing the corresponding private key. This method is used to ensure confidentiality. An analogy for public-key encryption is that of a locked mailbox with a mail slot. The mail slot is exposed and accessible to the public; its location (the street address) is in essence the public key. Anyone knowing the street address can go to the door and drop a written message through the slot; however, only the person who possesses the key can open the mailbox and read the message.

Digital signatures is where a message signed with a sender's private key can be verified by anyone who has access to the sender's public key, thereby proving that the sender signed it and that the message has not been tampered with. This method is used to ensure authenticity. An analogy for digital signatures is the sealing of an envelope with a personal wax seal. The message can be opened by anyone, but the presence of the seal authenticates the sender.

A central problem for public-key cryptography is proving that a public key is authentic, and has not been tampered with or replaced by a malicious third party. The usual approach to this problem is to use a public-key infrastructure (PKI), in which one or more third parties, known as certificate authorities, certify ownership of key pairs. Another approach, used by the software known as Pretty Good Privacy (PGP), is the "web of trust" method to ensure authenticity of key pairs.

Consumers are generating more and more content on the Internet every day. This content goes into thousands of distinct bulletin boards, blogs, and other social media applications. Unfortunately, the content of these Internet systems is not labeled with any canonical identity. So, despite public-key cryptography techniques, a user of one of these Internet systems may still not be able to associate accurately these data with anybody in particular.

SUMMARY OF THE INVENTION

What is needed is an improved method having features for addressing the problems mentioned above and new features not yet discussed. Broadly speaking, the present invention fills these needs by providing a method and system of a web browser toolbar signature. It should be appreciated that the present invention can be implemented in numerous ways, including as a method, a process, an apparatus, a system or a device. Inventive embodiments of the present invention are summarized below.

In one embodiment, a method of signing user content is disclosed. The method comprises receiving a producer identity of a producer who submitted the user content, receiving identifying information about the destination webpage, coding signed content using the user content and the producer identity, wherein the signed content includes a signature, and submitting the signed content to a server hosting the destination webpage.

In another embodiment, a method of verifying user content is disclosed. The method comprises receiving signed content, receiving producer identifying information of a producer of the signed content, decoding the signed content, and verifying the signed content.

In still another embodiment, an apparatus for signing user content is disclosed. The apparatus comprises a receiving device configured to receive a submission of user content from a source webpage, receive a producer identity of a producer who submitted the user content, and receive identifying information about the destination webpage; a coding device configured to code signed content using the user content and the producer identity, wherein the signed content includes a signature; and a submitting device configured to submit the sighed content to a server hosting the destination webpage.

In yet another embodiment, an apparatus for verifying user content is disclosed. The apparatus comprises a receiving device configured to receive signed content, a receiving device configured to receive producer identifying information of a producer of the signed content, a decoding device configured to decode the signed content, and a verifying device configured to verify the signed content.

In still yet another embodiment, a computer readable medium is disclosed for carrying one or more instructions for signing user content. The one or more instructions, when executed by one or more processors, cause the, one or more processors to perform the steps of receiving a submission of user content from a source webpage, receiving a producer identity of a producer who submitted the user content, receiving identifying information about the destination webpage, coding signed content using the user content and the producer identity, wherein the signed content includes a signature, and submitting the signed content to a server hosting the destination webpage.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION

An invention for a method and system for a web browser toolbar signature is disclosed. Numerous specific details are set forth in order to provide a thorough understanding of the present invention. It will be understood, however, to one skilled in the art, that the present invention may be practiced with other specific details.

The signature system presents a solution for consumers to label their data with a canonical identity string. The signature system may use the canonical identity string for a number of applications, including, but not limited to, aggregating identity, filtering identity and reputation management.

Aggregating identity is where the signature system identifies a particular string via common web search technology. The signature system then uses the particular string to create a list of all content a given person has contributed across the web.

Filtering identity is where, using lists of canonical identities, the signature system highlights, re-orders, or squelches content from particular individuals. Examples of such applications are a system to show only content from children under 13, a system to highlight content from your network of friends, or a search tool that exposes pages to which one's friends have contributed content.

Reputation management is where, given the use of the toolbar signature system, third parties create clearinghouses of reputation information. The signature system then uses the reputation information to restrict those individuals who are willing, to contribute content at a particular site. A user may use this solution to fight many types of online spam.

Figure 1:
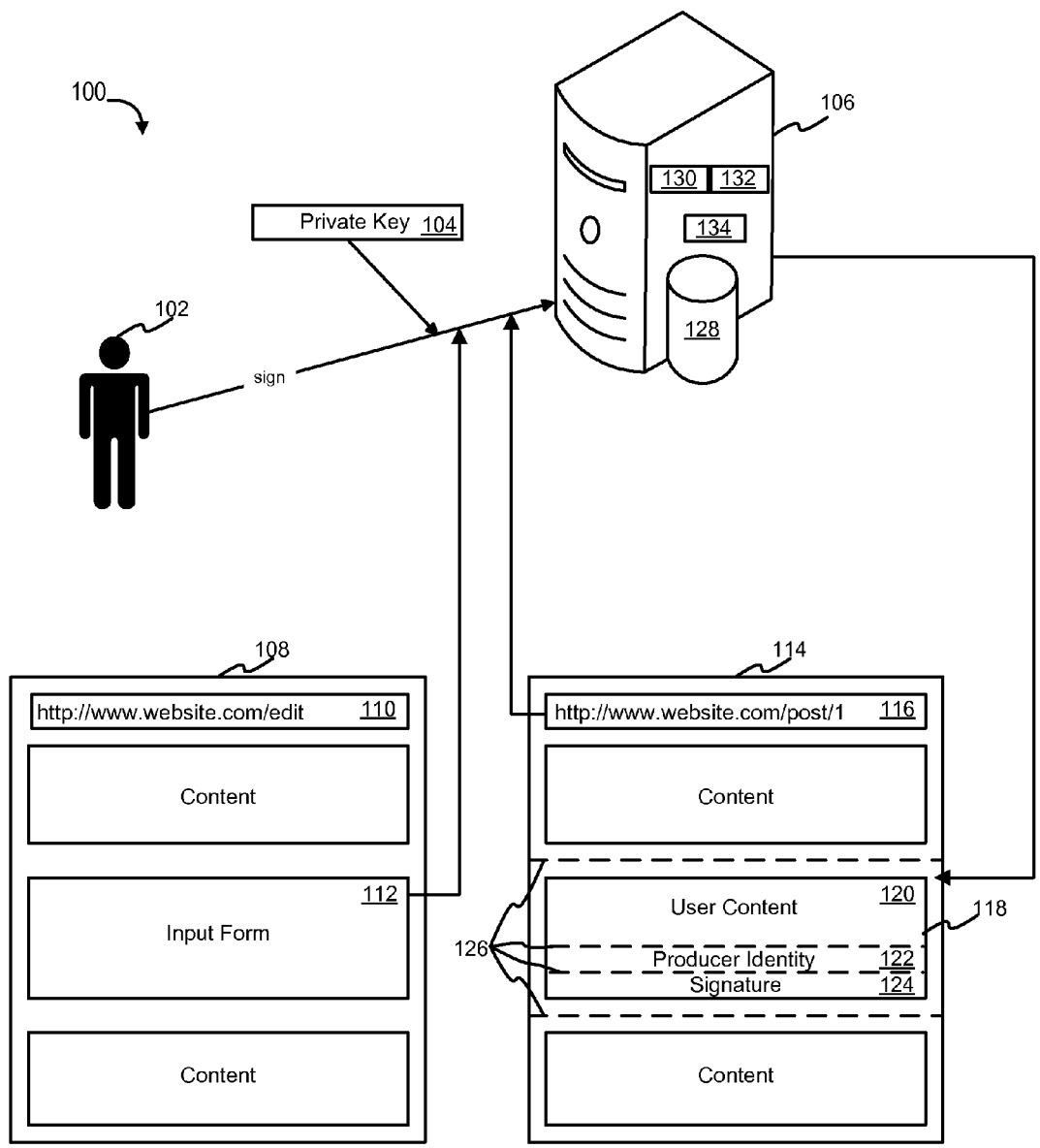
FIG. 1 is a schematic diagram of a signing process, in accordance with an embodiment of the present invention.

FIG. 1 is a schematic diagram of a signing process 100, in accordance with an embodiment of the present invention. The signature system carries out this signing process 100 in order to provide a canonical identity to user input 112 on a source webpage 108. A signing server 106 includes a receiving device 130, an encrypting/hashing/coding device 132 a submitting device 134 and a storing device 128. The devices of the signing server 106 are each configured to carry out one more operations of the signing process 100. Each device is hardware, software or a combination thereof.

The user input 112 is where a user posts content, such as text, into an input form. A toolbar (not shown) is in communication with the browser displaying the source webpage 108. It is important to note that the term "toolbar" is used here for explanatory purposes. However, the embodiment is not so limited. An alternative to a toolbar may be a browser, an external application or another appropriate device.

The signing process 100, including the toolbar, extracts some identifying piece of information about the source webpage 108 where the content is posted. This webpage identity can be a source URL 110 or a permalink. A URL is a Universal Resource Locator. A permalink is a URL that points to a specific blogging entry even after the entry has passed from the front webpage into the blog archives. The signing process 100 may also extract the text of the content being submitted.

The signing server 106 receives the webpage identity from the toolbar, identity of the producer 102 and possibly the content text. The producer identity is expressed as a private key 104 and/or a user name. The signing server 106 stores the producer identity. The signing server 106 uses this stored version of the producer identity to encrypt or to hash the data, which may include the webpage identity, the content text and producer identity. The encrypted data is signed content 118 that includes user content 120, the producer identity 122 and a signature 124. The encrypted data includes delimiters 126 to separate the data. The signature 124 and producer identity 122 are attached to the user content 120 and may be hidden (or embedded) in the destination webpage 114.

In the submission of user content of the Internet, most user generated content systems have some form of HTML filtering. Accordingly, the signing server may embed the delimiters 126, the signature 124 and the producer identity 122 using HTML (hypertext markup language) comments. HTML comments are invisible to the displayed HTML output. However, the HTML comments would allow any third party system to extract accurately the signed content 118. It is important to note that the publishing software that is publishing the content may be configured to strip HTML comments. Accordingly, the signature system must be aware of the specific software that is doing the publishing so that the signature system can return something that will prevent the publishing software from stripping the delimiters 126, the signature and the producer identity 122. The signature system may generally assume the content comes from a static database common to various content management systems.

The signature system would ideally like to have a rule that would allow the signature system to install delimiters 126 into the content in almost every case. Writing the signature out in text would allow the signature system to maintain delimiters 126 in a wide variety of publishing systems. An alternative would be for the signature system to wrap the delimiters 126 in an HTML element in a clear style. Eventually, an industry standard may be developed that defines certain rules to define clearly how to prevent the publishing software from stripping delimiters 126. In the mean time, the signature system has a way to delimit the content and to write the producer identity 122 and the signature 124. For example, when publishing a comment, the signature system may not be able to use HTML comments, but may be able to use HTML elements with a given style tag; the signing system would write the content in an empty paragraph; in other words, the signature system defines that the paragraph is not there; to the outside user, the paragraph looks it's not there; however, when the publishing software comes across the content, the publishing software can identify that empty paragraphs is the way the delimiters are defined; the signature 124 and any other need data can therefore be extracted as such. This technique and other similar techniques require that the signing server 106 knows what the filtering rules will be for the content submitted to the server that is hosting the destination webpage 114.

The signature system does not have to inform the producer 102 that the signature 124 and the producer identity 122 are attached to the user content 120. The signing process 100, including the signing server 106, submits the signed content 118 in some machine-readable format to the server hosting the destination webpage 114 located at the destination URL 116. The source URL 110 and the destination URL 116 may be the same, but not necessarily. The destination webpage 114 is where any user may retrieve the submitted information.

Figure 2:
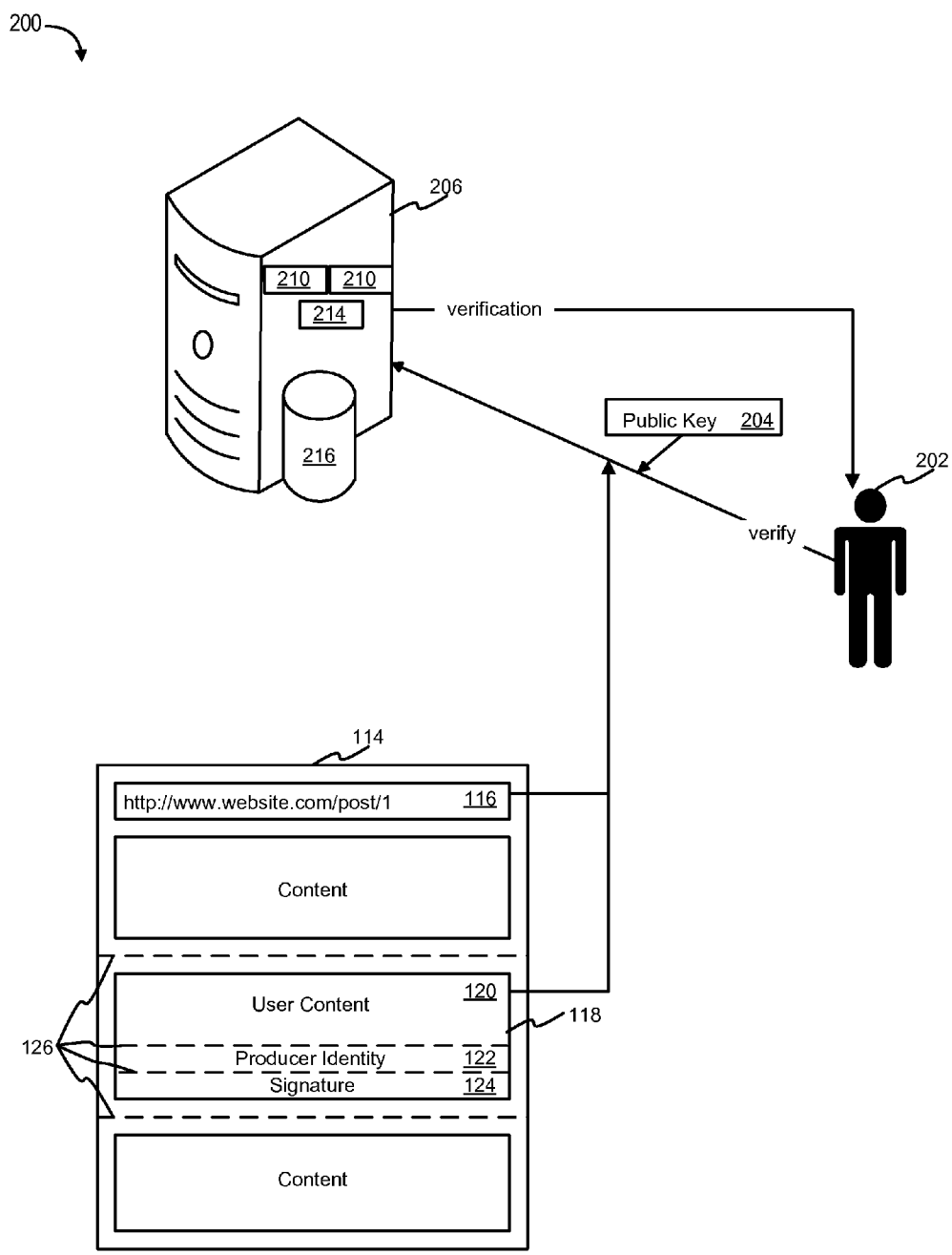
FIG. 2 is a schematic diagram of a verifying process, in accordance with an embodiment of the present invention.

FIG. 2 is a schematic diagram of a verifying process 200, in accordance with an embodiment of the present invention. A consumer 202 has come along and is aware that there is a signature 124 attached to the user content. As discussed above with reference to FIG. 1, the signing server 106 stores the producer identity. A verifying server 206 includes a receiving device 210, a decrypting/re-hashing/decoding device 212, a verifying device 214 and a storing device 216. The devices of the verifying server 206 are each configured to carry out one more operations, of the verifying process 200. Each device is hardware, software or a combination thereof. The verifying server 206 may the same thing as the signing server 106, but not necessarily. The verifying server 206 maintains the producer identity through one of two methods, either asynchronous encryption or trusted identity storage.

Asynchronous encryption is where, at the time of submission of the user input 112, the toolbar employs a private key 104 known only to the author to encrypt the message data. This signed message along with the actual content is submitted to the server hosting the destination webpage 114. At the time of collection of the signed content 118, any consumer 202 can take this signature, along with the public key 204 of the producer 102, and decrypt the message. This decrypted message can be verified against the signed content 118 embedded in the webpage to ensure that the person who wrote the content is truly the person who signed it.

Trusted identity storage is where, at the time of submission of the user input 112, the toolbar employs a secret identity known only to the user and a trusted identity service. The secret identity may be, for example, a username. This identity along with the signed message is submitted to the server hosting the destination webpage 114. These data are hashed using a one-way hash function. At the time of collection of the signed content 118, any consumer 202 can take the submitted signature 124 along with the message and submit them to the verifying server 206. The verifying server 206 can look up the secret identity known to the user, re-hash the content, and verify that the signature 124 is correct. This service can extend an application programming interface (API) that will allow any third party system to verify the identity 122 of an individual.

Figure 3:
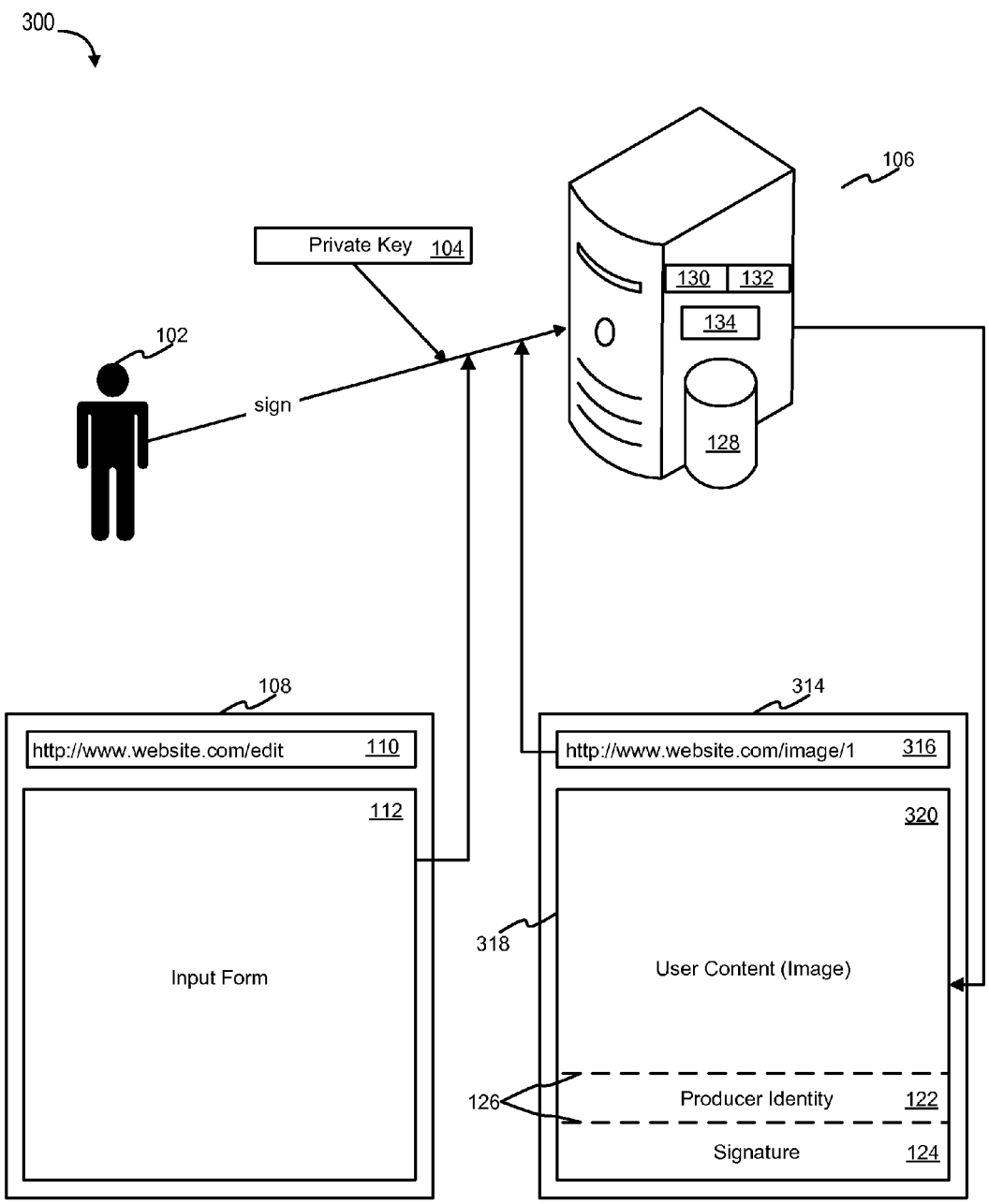
FIG. 3 is a schematic diagram of a signing process where the user input is an image, in accordance with an embodiment of the present invention.

FIG. 3 is a schematic diagram of a signing process 300 where the user input 112 is an image, in accordance with an embodiment of the present invention. This signing process 300 is the same as the signing process 100 of FIG. 1, except the user input 112 is an image instead of text. This example shows the user image content 320 for explanatory purposes. However, the embodiment is not so limited. The user image content 320 may alternatively be audio, video, or other rich media. Accordingly, the signing process 300 does not involve the signing server 106 encrypting and submitting text data to the server hosting the destination webpage 314 located at the destination URL 316. Rather, the signing server submits signed content 318, which includes user image content 320, a producer identity 122 and a signature 124.

Figure 4:
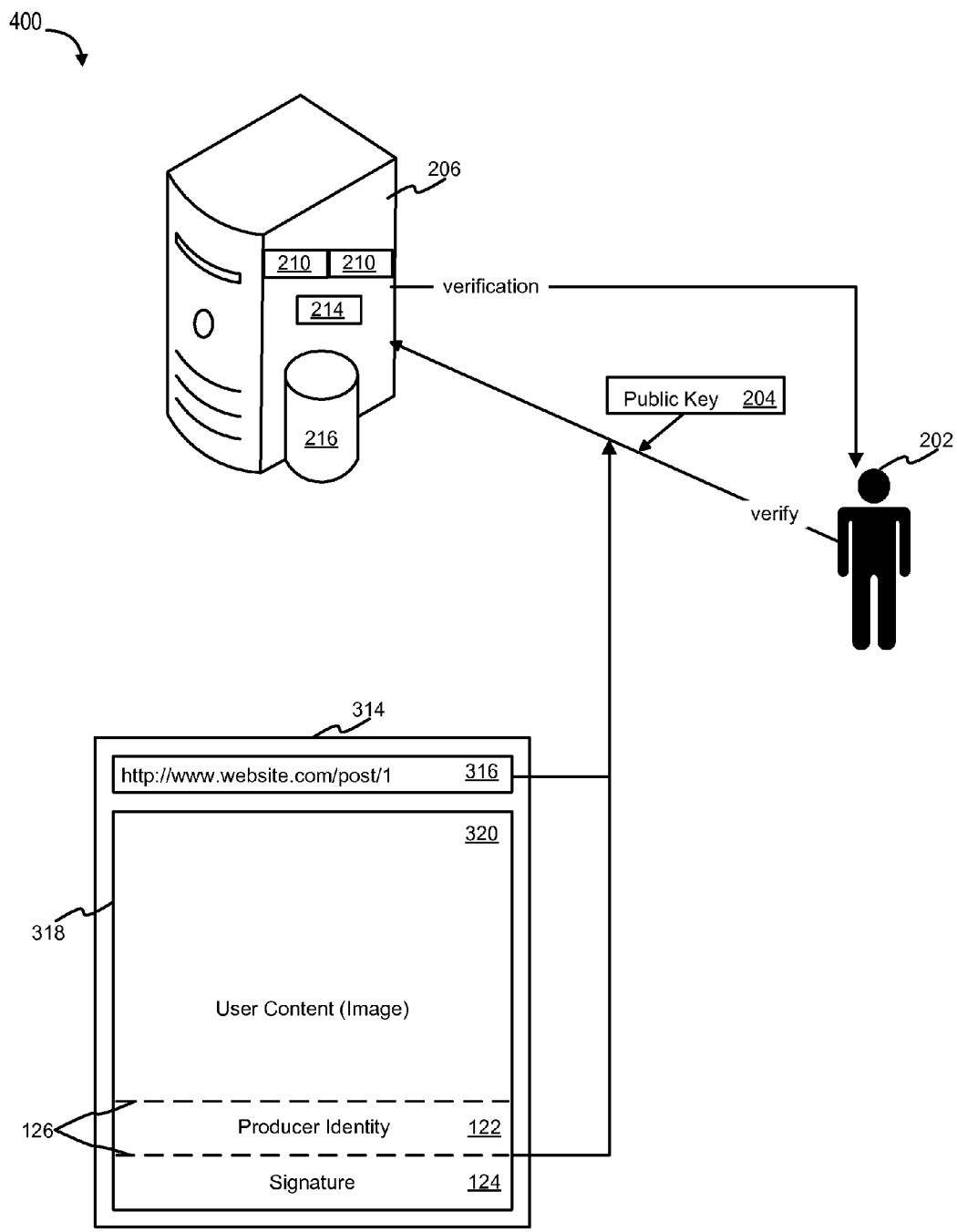
FIG. 4 is a schematic diagram of a verifying process where the user content is rich media, in accordance with an embodiment of the present invention.

FIG. 4 is a schematic diagram of a verifying process 400 where the user content 320 is rich media, in accordance with an embodiment of the present invention. This verifying process 400 is the same as the verifying process 200 of FIG. 2, except the user image content 320 is an image instead of text. This example shows the user image content 320 for explanatory purposes. However, the embodiment is not so limited. The user image content 320 may alternatively be audio, video, or other rich media. The signed content 318 includes user image content 320, a producer identity 122 and a signature 124.

Figure 5A:
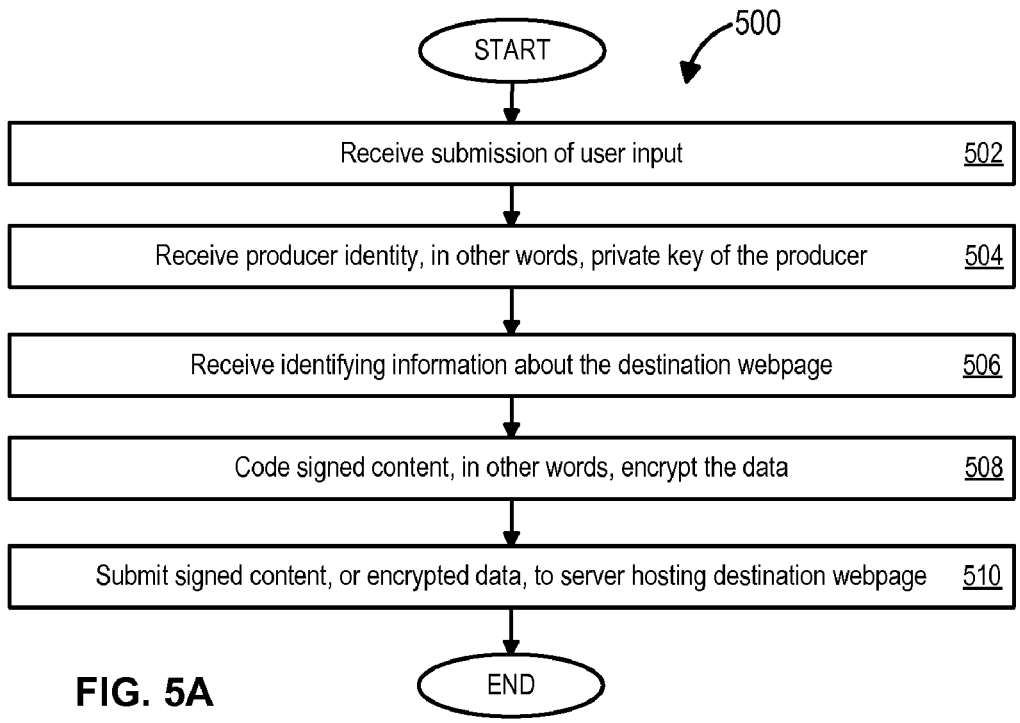
FIG. 5A is a flowchart for a method of signing user content where the storage method is asynchronous encryption, in accordance with an embodiment of the present invention.

FIG. 5A is a flowchart for a method 500 of signing user content where the storage method is asynchronous encryption, in accordance with an embodiment of the present invention. The method 500 starts in step 502 where the signing server receives a submission of user input that a user posts to the source webpage. In step 504, the signing server receives the identity of the producer who is submitting the user content. In this method 500, the producer identity is a private key from a producer of the user content. In step 506, the signing server also receives an identifying piece of information about the destination webpage. This identifying information may be a URL, or a permalink. Then, in step 508, the signing server codes signed content. In other words, the signed server encrypts the data it has received using the private key. Next, in step 510, the signing server submits the signed content to the server hosting the destination webpage. In other words, the signing server submits the encrypted data to the server hosting the destination webpage. The method 500 is then at an end.

Figure 5B:
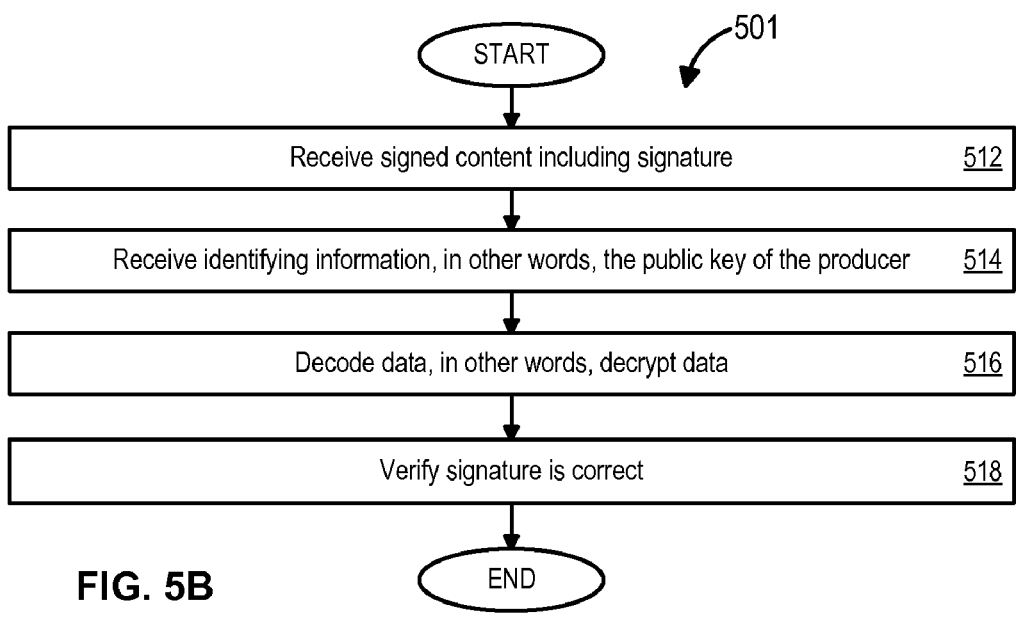
FIG. 5B is a flowchart for a method of verifying user content where the storage method is asynchronous encryption, in accordance with an embodiment of the present invention.

FIG. 5B is a flowchart for a method 501 of verifying user content where the storage method is asynchronous encryption, in accordance with an embodiment of the present invention. The method 501 starts in step 512 where the verifying server receives a submission of signed content, including a signature. In step 514, the verifying server receives identifying information of the producer. In this example, that identifying information is the producer's public key. Then, in step 516, the trusted identity server uses the signature and the public key to decrypt the message. Next, in step 518, the verifying server verifies the signature is correct. In other words, the verifying server verifies the decrypted message against the signed content embedded in the webpage to ensure that the person who wrote the content is truly the person who signed it. The method 501 is then at an end.

Figure 6A:
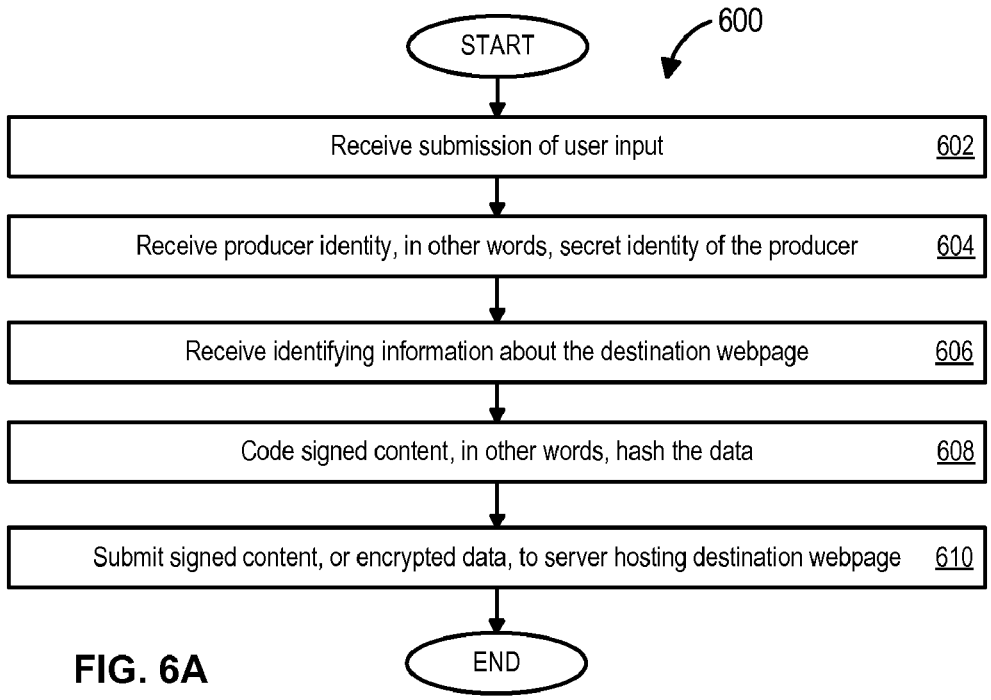
FIG. 6A is a flowchart for a method of signing user content where the storage method is trusted identity storage, in accordance with an embodiment of the present invention.

FIG. 6A is a flowchart for a method 600 of signing user content where the storage method is trusted identity storage, in accordance with an embodiment of the present invention. The method 600 starts in step 602 where the signing server receives a submission of user input that user posts to the source webpage. In step 604, the signing server receives the identity of the producer who is submitting the user content. In this method 600, the producer identity is a secret identity known only to the user and a trusted identity service. In step 606, the signing server also receives an identifying piece of information about the destination webpage. This identifying information may be a URL or a permalink. Then, in step 608, the signing server codes signed content. In other words, the signed server hashes the data it has received using a one-way hash function. Next, in step 610, the signing server submits the signed content to the server hosting the destination webpage. In other words, the signing server submits the hashed data to the server hosting the destination webpage. The method 600 is then at an end.

Figure 6B:
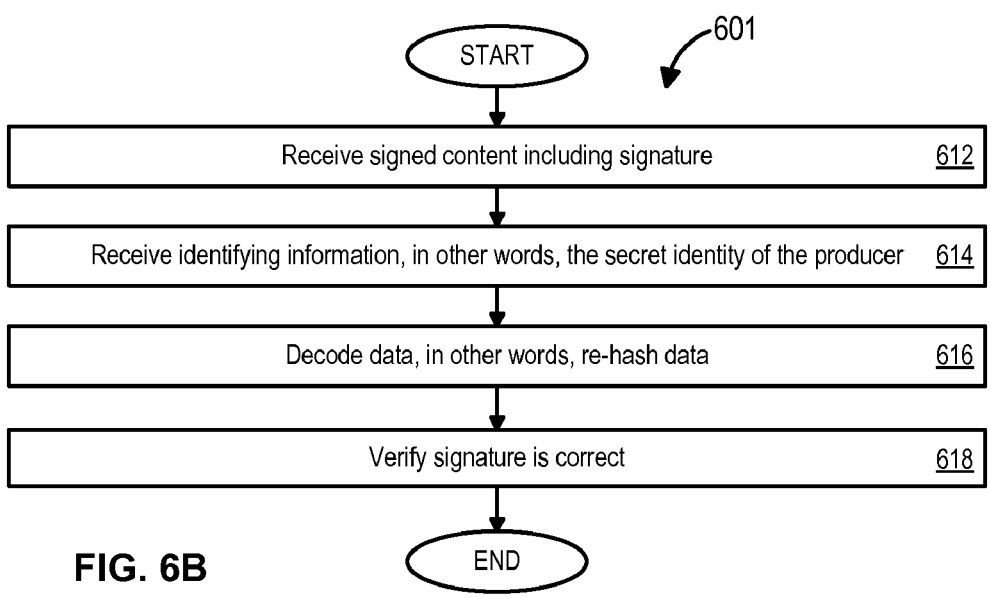
FIG. 6B is a flowchart for a method of verifying user content where the storage method is trusted identity storage, in accordance with an embodiment of the present invention.

FIG. 6B is a flowchart for a method 601 of verifying user content where the storage method is trusted identity storage, in accordance with an embodiment of the present invention. The method 601 starts in step 612 where the verifying server receives a submission of signed content, including a signature. In step 614, the verifying server receives identifying information of the producer. In this example, the identifying information is the producer's secret identity known only to the user and the trusted identity server. Such receipt is accomplished by the verifying server looking up the secret identity in a database. Then, in step 616, the trusted identity server re-hashes the user content. Next, in step 618, the verifying server verifies that the signature is correct. This method 601 may include extending an API that will allow any third party system to verify the identity of an individual. The method 601 is then at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving a producer identity of a producer who submitted the user content, receiving identifying information about the destination webpage, coding signed content using the user content and the producer identity, wherein the signed content includes a signature, and submitting the signed content to a server hosting the destination webpage, according to processes of the present invention.

Advantages

The signature system allows searching by user. Whenever a signature is identified in a piece of content, a trusted version of the public identity can be stored along with the content of the webpage. Such storage allows anyone to search for content by user along with normal keywords.

The signature system allows subscribing to a user. Whenever a search engine discovers a new piece of content produced by a given user, this piece of content can be redistributed to anyone who chooses to subscribe to updates by this user.

The signature system allows signing of rich media. Similar to the signing and verification method for text data, the same technique can be used to sign and verify images, audio, video, or other rich media. In this case, the URL, of the media plus an embedded signature can be used to verify the author.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method of signing user content, the method comprising:
   receiving, at a computer of a signing server, a submission of user content by a producer from a source webpage, and wherein the producer posts the user content to said source webpage;
   receiving a producer identity comprising a user name and a private key corresponding to the producer;
   receiving identifying information about a publicly accessible destination webpage;
   encrypting the user content using the producer identity;
   creating signed user content by appending the producer identity and a signature corresponding to the producer to the encrypted user content at the signing server;
   submitting, using said computer, the signed user content to a server hosting the destination webpage from the signing server, and
   transmitting, from the server hosting the destination webpage, the signed content to a viewer in response to a search query corresponding to at least one of the producer identity and the signature.

2. The computer implemented method of claim 1, wherein encrypting the signed content is performed further using a secret identity of the producer known only to the producer and a trusted identity service.

3. A computer implemented method of signing user content, the method comprising:
   receiving, at a computer of a signing server, user content, submitted by a producer, from a source webpage, and wherein the producer posts the user content to said source webpage;
   receiving a producer identity comprising a user name and a private key corresponding to the producer;
   receiving identifying information about a publicly accessible destination webpage;
   encrypting the user content using the producer identity;
   creating signed user content by appending a the producer identity and a signature corresponding to the producer to the encrypted user content at the signing server;
   submitting the signed user content to a server hosting the destination webpage from the signing server; and
   transmitting, from the server hosting the destination webpage, the signed user content to a subscribed viewer in response to a viewer subscription corresponding to the signature.

4. The computer implemented method of claim 3, wherein encrypting the signed content is performed further using a secret identity of the producer known only to the producer and a trusted identity service.

5. A computer implemented method of signing user content, the method comprising:
   receiving, at a computer of a signing server, user content, submitted by a producer, from a source webpage, and wherein the producer posts the user content to said source webpage;
   receiving a producer identity comprising a user name corresponding to the producer;

receiving identifying information about a publicly accessible destination webpage;

coding the user content using the producer identity;

creating signed user content by appending a the producer identity and a signature corresponding to the producer to the coded user content at the signing server;

submitting the signed user content to a server hosting the destination webpage from the signing server;

transmitting, from the server hosting the destination webpage, the signed user content to a reputation information clearinghouse, wherein the reputation information clearinghouse uses the signed user content to increment a reputation parameter corresponding to the signature.

6. The method of claim 5, wherein coding the user content further comprises encrypting the user content using a private key of the producer.

7. The method of claim 5, wherein coding the user content further comprises encrypting the user content using a secret identity of the producer known only to the producer and a trusted identity service.

* * * * *